United States Patent
Jeong et al.

(10) Patent No.: US 12,107,781 B2
(45) Date of Patent: *Oct. 1, 2024

(54) METHOD FOR GENERATING AND TRANSMITTING A REFERENCE SIGNAL FOR UPLINK DEMODULATION IN A CLUSTERED DFT-SPREAD OFDM TRANSMISSION SCHEME

(71) Applicant: Electronics and Telecommunications Research Institute, Daejeon (KR)

(72) Inventors: Byung Jang Jeong, Daejeon (KR); Young Jo Ko, Daejeon (KR); Bang Won Seo, Daejeon (KR); Jae Young Ahn, Daejeon (KR)

(73) Assignee: Electronics and Telecommunications Research Inst., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,448

(22) Filed: Apr. 15, 2015

(65) Prior Publication Data

US 2015/0222404 A1    Aug. 6, 2015

Related U.S. Application Data

(63) Continuation of application No. 14/031,844, filed on Sep. 19, 2013, now Pat. No. 9,025,684, which is a
(Continued)

(30) Foreign Application Priority Data

Sep. 18, 2009    (KR) .................. 10-2009-0088521

(51) Int. Cl.
*H04L 5/00* (2006.01)
*H04L 27/26* (2006.01)
*H04W 72/21* (2023.01)

(52) U.S. Cl.
CPC .......... *H04L 5/0048* (2013.01); *H04L 5/0007* (2013.01); *H04L 27/2607* (2013.01); *H04W 72/21* (2023.01)

(58) Field of Classification Search
None
See application file for complete search history.

(56) References Cited

U.S. PATENT DOCUMENTS 7,911,935 B2    3/2011    Akita et al.
8,116,271 B2    2/2012    Pi
(Continued)

FOREIGN PATENT DOCUMENTS

KR    1020060131094    12/2006
KR    1020080097360    11/2008
(Continued)

OTHER PUBLICATIONS

International Search Report and Written Opinion for Application No. PCT/KR2010/006452, dated May 24, 2011.
(Continued)

*Primary Examiner* — Jason E Mattis
*Assistant Examiner* — Bao G Nguyen
(74) *Attorney, Agent, or Firm* — Insight Law Group, PLLC; Seung Lee

(57) ABSTRACT

Disclosed is a method for generating and transmitting a reference signal in a clustered DFT-spread OFDM transmission scheme. A method for generating and transmitting a DM-RS in a clustered DFT-spread-OFDM scheme comprises: a step of generating DM-RS sequences corresponding to the number of clusters allocated for an uplink transmission; and a step of mapping the generated DM-RS sequences to the relevant DM-RS symbol positions for each cluster. Accordingly, the method for generating and transmitting a reference signal according to the present invention,
(Continued)

in which DM-RS sequences are allocated and transmitted on a cluster basis, uses a complete DM-RS sequence for each cluster, and therefore inter-cell interference can be weakened, and problems which might occur when applied to a multi-user MIMO (MU-MIMO) scheme can be solved.

32 Claims, 4 Drawing Sheets

Related U.S. Application Data continuation of application No. 13/387,016, filed as application No. PCT/KR2010/006452 on Sep. 17, 2010, now Pat. No. 8,705,644.

(56) References Cited

U.S. PATENT DOCUMENTS

| | | | |
|---|---|---|---|
| 8,400,958 B2 | 3/2013 | Ko et al. | |
| 8,423,038 B2 | 4/2013 | Iwai et al. | |
| 8,503,425 B2 | 8/2013 | Chung et al. | |
| 8,705,463 B2 | 4/2014 | Yu et al. | |
| 9,025,684 B2* | 5/2015 | Jeong | H04L 5/0007 |
| | | | 375/260 |
| 2005/0111406 A1* | 5/2005 | Pasanen | H04L 1/0618 |
| | | | 370/480 |
| 2007/0183386 A1 | 8/2007 | Muharemovic et al. | |
| 2007/0264955 A1* | 11/2007 | Tsai | H04W 68/00 |
| | | | 455/186.1 |
| 2008/0080467 A1 | 4/2008 | Pajukoski et al. | |
| 2008/0267137 A1* | 10/2008 | Dabak | H04W 56/001 |
| | | | 370/336 |
| 2008/0318608 A1 | 12/2008 | Inoue et al. | |
| 2009/0060004 A1* | 3/2009 | Papasakellariou | H04J 13/22 |
| | | | 375/140 |
| 2009/0080500 A1 | 3/2009 | Muharemovic et al. | |
| 2009/0201863 A1 | 8/2009 | Pi | |
| 2010/0002804 A1 | 1/2010 | Ogawa et al. | |
| 2010/0067512 A1* | 3/2010 | Nam | H04L 5/0023 |
| | | | 375/267 |
| 2010/0135242 A1* | 6/2010 | Nam | H04L 5/0007 |
| | | | 370/330 |
| 2010/0142455 A1 | 6/2010 | Imamura | |
| 2010/0157924 A1* | 6/2010 | Prasad | H04B 7/0452 |
| | | | 370/329 |
| 2010/0173642 A1 | 7/2010 | Iwai et al. | |
| 2010/0208673 A1 | 8/2010 | Nam et al. | |
| 2010/0215031 A1 | 8/2010 | Kim et al. | |
| 2010/0238877 A1 | 9/2010 | Nam et al. | |
| 2010/0278106 A1* | 11/2010 | Kim | H04W 48/08 |
| | | | 370/328 |
| 2010/0284265 A1 | 11/2010 | Ogawa et al. | |
| 2010/0285755 A1 | 11/2010 | Iwai et al. | |
| 2011/0044313 A1 | 2/2011 | Jeong et al. | |
| 2011/0075760 A1 | 3/2011 | Ogawa et al. | |
| 2011/0110357 A1 | 5/2011 | Chung et al. | |
| 2011/0141982 A1* | 6/2011 | Zhang | H04L 27/26134 |
| | | | 370/329 |
| 2012/0057543 A1 | 3/2012 | Yokomura et al. | |
| 2012/0093120 A1 | 4/2012 | Ko et al. | |
| 2013/0182692 A1 | 7/2013 | Dai et al. | |

FOREIGN PATENT DOCUMENTS

| | | |
|---|---|---|
| KR | 10-2009-0031646 | 3/2009 |
| KR | 1020090075853 | 7/2009 |
| KR | 1020090093025 | 9/2009 |
| WO | 2008/093716 A1 | 8/2008 |
| WO | 2008/155904 A1 | 12/2008 |
| WO | 2009/019878 A1 | 2/2009 |
| WO | 2011/034392 A2 | 3/2011 |

OTHER PUBLICATIONS

Kim, Hak-Seong, "Advanced Technologies and Related Issues for 3GPP LTE-A," MCTR Lab./ 3G Standard and System Research Gr. LG Electronics, 100 pages (2008).

Park, Ok-Sun et al., "DSP design and implementation for the UE Modem Controller of the 3G Long-Term Evolution," The Fourth International Conference on Wireless and Mobile Communications, pp. 395-398 (2008).

Prasad, Narayan et al., "Efficient Receiver Algorithms for DFT-Spread OFDM Systems," IEEE Transactions on Wireless Communications, vol. 8(6):3216-3225 (2009).

* cited by examiner

METHOD FOR GENERATING AND TRANSMITTING A REFERENCE SIGNAL FOR UPLINK DEMODULATION IN A CLUSTERED DFT-SPREAD OFDM TRANSMISSION SCHEME

CROSS-REFERENCE TO RELATED APPLICATION

This application is a continuation of U.S. patent application Ser. No. 14/031,844, filed on Sep. 19, 2013, which is a continuation of U.S. Pat. No. 8,705,644, issue on Apr. 22, 2014, which is a continuation of PCT application No: PCT/KR2010/006452 filed Sep. 17, 2010, the entire contents of which are incorporated herein by reference.

TECHNICAL FIELD

Example embodiments of the present invention relate to a method of generating and transmitting a reference signal, and more particularly, to a method of generating and transmitting an uplink demodulation reference signal in a clustered discrete Fourier transformer (DFT)-spread-orthogonal frequency division multiplexing (OFDM) transmission scheme used as an uplink transmission scheme in the 3rd generation partnership project (3GPP) long-term evolution (LTE).

BACKGROUND ART

Single-carrier (SC)-frequency division multiple access (FDMA), which is similar to OFDM, but is capable of reducing power consumption and power amplifier cost of a portable terminal by decreasing a peak to average power ratio (PAPR) has been adopted in an uplink of LTE standardized as part of a next-generation mobile communication standard in 3GPP.

SC-FDMA is a technique that is very similar to OFDM in which a signal is divided and transmitted in sub-carriers using a fast Fourier transformer (FFT) and an inverse-FFT (IFFT) for transmission. Further, use of a guard interval (cyclic prefix) enables a simple equalizer to be used in a frequency domain with respect to inter-symbol interference (ISI) caused by multi-path fading, as in an existing OFDM technique. However, power efficiency of a transmitter has been enhanced by reducing a PAPR at a transmitter stage by about 2 to 3 dB using an additional unique technique.

A problem associated with an existing OFDM transmitter is that frequency-axis signals loaded on respective sub-carriers are transformed into time-axis signals by the IFFT. Since the IFFT takes a form in which the same operations are in parallel, PAPR increase is caused.

FIG. 1 is a block diagram for explaining an SC-FDMA transmission scheme that is an uplink access scheme adopted in 3GPP LTE.

In order to solve such a problem, in SC-FDMA, a signal is first processed by a discrete Fourier transformer (DFT) 102 before the signal is mapped to a sub-carrier, as shown in FIG. 1. A signal spread (i.e., pre-coded) by the DFT is mapped 103 to the sub-carrier, and then transformed into a time-axis signal by the IFFT 104. In SC-FDMA, a PAPR of the time domain signal from the IFFT 104 is not greatly increased due to correlations between the DFT 102, the sub-carrier mapping 103 and the IFFT 104, unlike OFDM. Accordingly, SC-FDMA is advantageous in transmission power efficiency.

That is, SC-FDMA has robustness for a multi-path channel by having a similar structure to OFDM, and enables efficient use of a power amplifier (PA) by fundamentally resolving a problem of the existing OFDM that an IFFT operation increases the PAPR. Meanwhile, SC-FDMA is also called a DFT-spread-OFDM (DFT-s-OFDM)

Further, standardization of LTE-Advanced, which is an enhanced version of LTE, has been actively conducted by the 3GPP group, and an SC-FDMA technique and an OFDM technique have been competing in the LTE-Advanced standardization process, as in the LTE standardization process. However, a clustered DFT-s-OFDM scheme allowing for discontinuous resource allocation has been adopted.

FIG. 2 is a block diagram for explaining a clustered DFT-s-OFDM transmission scheme adopted as an uplink access scheme in an LTE-Advanced standard.

An important characteristic of the clustered DFT-s-OFDM scheme is that the clustered DFT-s-OFDM scheme can flexibly cope with a frequency selective fading environment by enabling frequency selective resource allocation.

Meanwhile, in the case of an LTE uplink, a demodulation reference signal (DM-RS) used for channel estimation for demodulating a physical uplink control channel (PUCCH) and a physical uplink shared channel (PUSCH) is generated and transmitted using a constant amplitude zero autocorrelation (CAZAC) sequence. In order to identify the DM-RSs between terminals for multi-user MIMO (MU-MIMO), DM-RS orthogonality between the terminals is realized by using, in the DM-RS, the CAZAC sequence having a different cyclic shift value between the terminals.

In this case, since the clustered DFT-s-OFDM scheme adopted as an uplink access scheme of the LTE-Advanced allows discontinuous resource allocation, unlike SC-FDMA that is an uplink access scheme of conventional LTE, transmitted uplink data may be divided into several clusters.

Accordingly, the clustered DFT-s-OFDM scheme adopted as the uplink access scheme of the LTE-advanced requires a method of generating and transmitting a DM-RS in a cluster unit, unlike SC-FDMA that is the uplink access scheme of the conventional LTE.

DISCLOSURE

Technical Problem

Accordingly, example embodiments of the present invention are provided to substantially obviate one or more problems due to limitations and disadvantages of the related art.

Example embodiments of the present invention provide a method of generating and transmitting a reference signal, which is suitable for a clustered DFT-s-OFDM transmission scheme.

Technical Solution

In some example embodiments, a method of generating and transmitting a reference signal, which is suitable for a clustered DFT-s-OFDM transmission scheme, includes allocating one DM-RS sequence to each terminal for uplink transmission; dividing the allocated DM-RS sequence according to sizes of resource blocks (RBs) allocated to respective transmitted clusters; and mapping divided DM-RS sequences to locations of corresponding DM-RS symbols of the respective clusters for transmission.

Here, the allocating of the DM-RS sequence may include allocating a DM-RS sequence having a length corresponding to a sum of numbers of sub-carriers of the RBs allocated to the respective transmitted clusters.

In this case, when the length of the DM-RS sequence is equal to or greater than a length corresponding to three RBs, the DM-RS sequence may be generated from an extended Zadoff-Chu (ZC) sequence, which is a kind of constant amplitude zero autocorrelation (CAZAC) sequence, and when the length of the DM-RS is smaller than the length corresponding to the three RBs, the DM-RS sequence may be generated using a computer-generated (CG)-CAZAC sequence.

Here, the mapping of the divided DM-RS sequences to locations of corresponding DM-RS symbols of the respective clusters for transmission may include: for a slot to which a normal CP in which one slot consists of seven symbols is applied, the DM-RS may be mapped to the fourth symbol for transmission, and for a slot to which an extended CP in which one slot consists of six symbols is applied, the DM-RS may be mapped to the third symbol for transmission.

In other example embodiments, a method of generating and transmitting a reference signal, which is suitable for a clustered DFT-s-OFDM transmission scheme, includes generating a DM-RS sequence to each cluster allocated for uplink transmission; and mapping the generated DM-RS sequences to locations of corresponding DM-RS symbols of the respective clusters for transmission.

Here, the generating of the DM-RS sequence for each allocated cluster may include: when a length of the DM-RS sequence is equal to or greater than a length corresponding to three RBs, the DM-RS sequence may be generated from an extended ZC sequence, which is a kind of CAZAC sequence, and when the length of the DM-RS is smaller than the length corresponding to the three RBs, the DM-RS sequence may be generated using a CG-CAZAC sequence.

Here, the mapping of the generated DM-RS sequences to the locations of corresponding DM-RS symbols of the respective clusters for transmission may include: for a slot to which a normal CP in which one slot consists of seven symbols is applied, the DM-RS may be mapped to the fourth symbol for transmission, and for a slot to which an extended CP in which one slot consists of six symbols is applied, the DM-RS may be mapped to the third symbol for transmission.

Advantageous Effects

Use of the method of generating and transmitting an RS signal as described above enables DM-RS signal generation and transmission corresponding to flexible frequency resource allocation of the clustered DFT-s-OFDM selected as a uplink access system in 3GPP LTE-advanced.

In particular, in accordance with the method of generating and transmitting a RS signal in which a DM-RS sequence is allocated to each cluster for transmission according to the present invention, a complete DM-RS sequence is used in a cluster unit. Thus, inter-cell interference is reduced and multi-user MIMO (MU-MIMO) is applied with no problem.

MODES OF THE INVENTION

Figure 1:
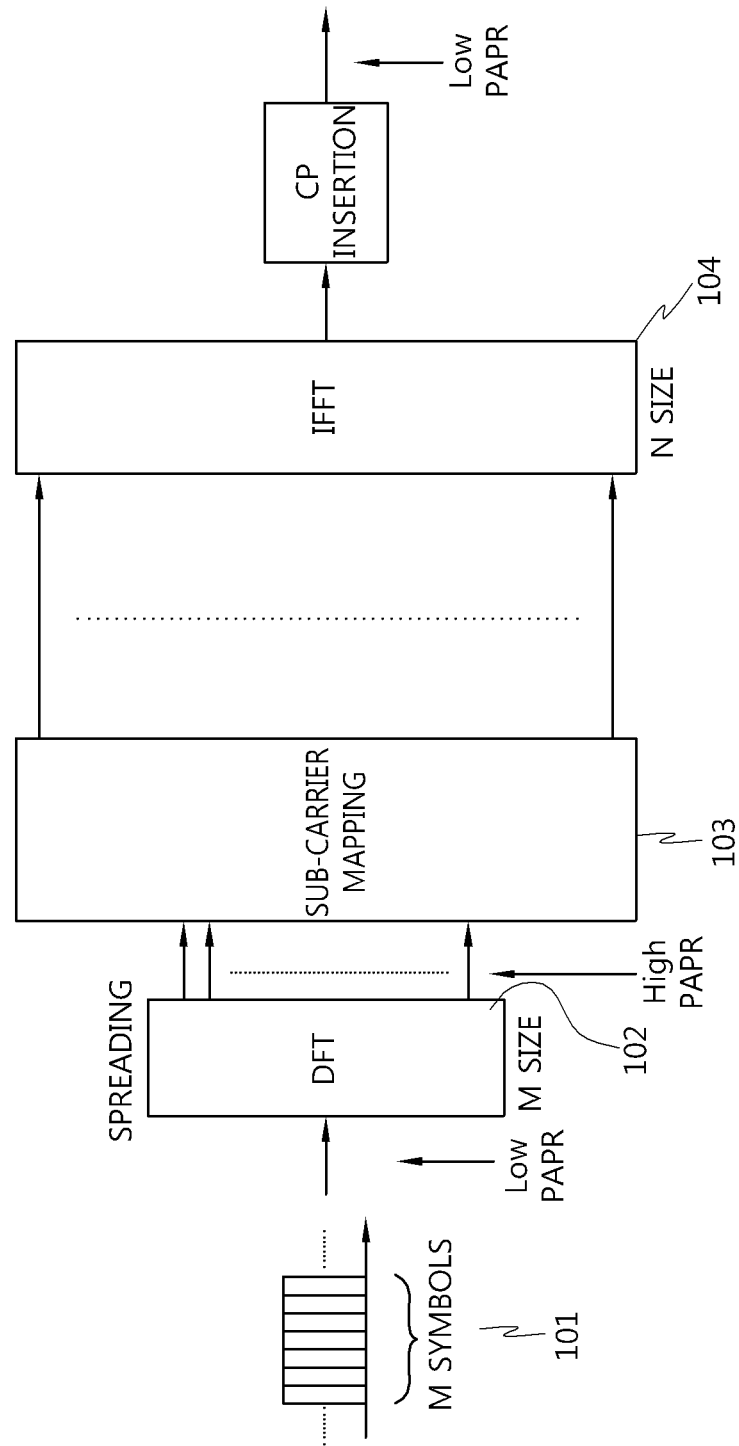
FIG. 1 is a block diagram for explaining an SC-FDMA transmission scheme that is an uplink access scheme adopted in 3GPP LTE.
Figure 2:
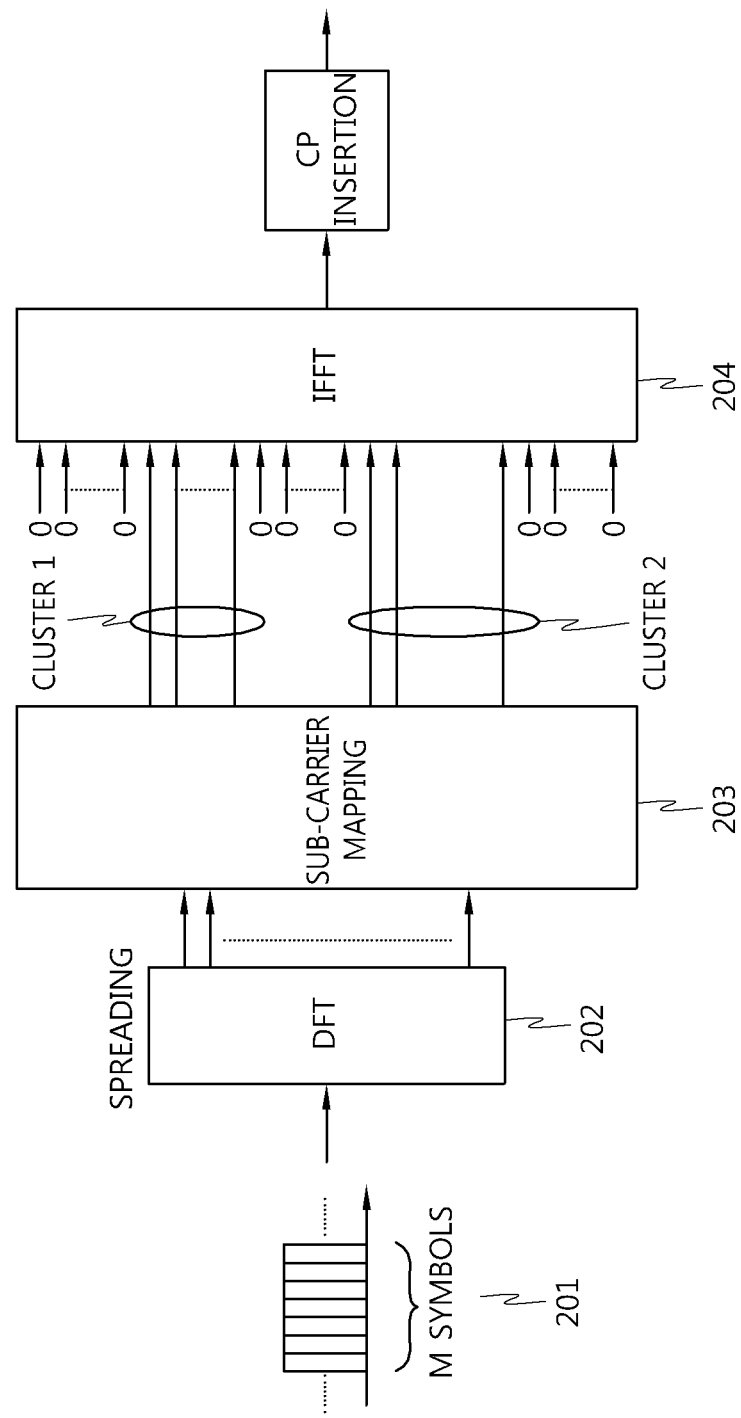
FIG. 2 is a block diagram for explaining a clustered DFT-s-OFDM transmission scheme adopted as an uplink access scheme in an LTE-Advanced standard.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A "terminal" used herein refers to a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or the like. The terminal may include, for example, a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storage and player home appliance having a wireless communication function, and an Internet home appliance capable of wireless Internet accessing and browsing, as well as a portable unit or terminal having a combination of such functions, but is not limited thereto.

A "base station" used herein generally refers to a stationary point communicating with a terminal, and may be called a base station, node-B, eNode-B, a base transceiver system (BTS), an access point, or the like.

The present invention will now be described in greater detail hereinafter with reference to the accompanying drawings.

In the present invention, two embodiments of a method of generating and transmitting a DM-RS suitable for a clustered DFT-s-OFDM scheme that is an uplink access scheme of LTE-Advanced will be described in detail.

A first example embodiment provides a method by which one DM-RS sequence is generated for each terminal, divided according to length of clusters divided using a clustered DFT-s-OFDM scheme, and mapped to locations of corresponding DM-RS symbols in the respective clusters for transmission.

A second example embodiment provides a method by which several DM-RS sequences can be allocated to one terminal, in which DM-RS sequences corresponding in number to clusters of one terminal are allocated and mapped to DM-RS symbol locations in the respective clusters for transmission.

Hereinafter, the two embodiments will be described in detail.

First Example Embodiment

Figure 3:
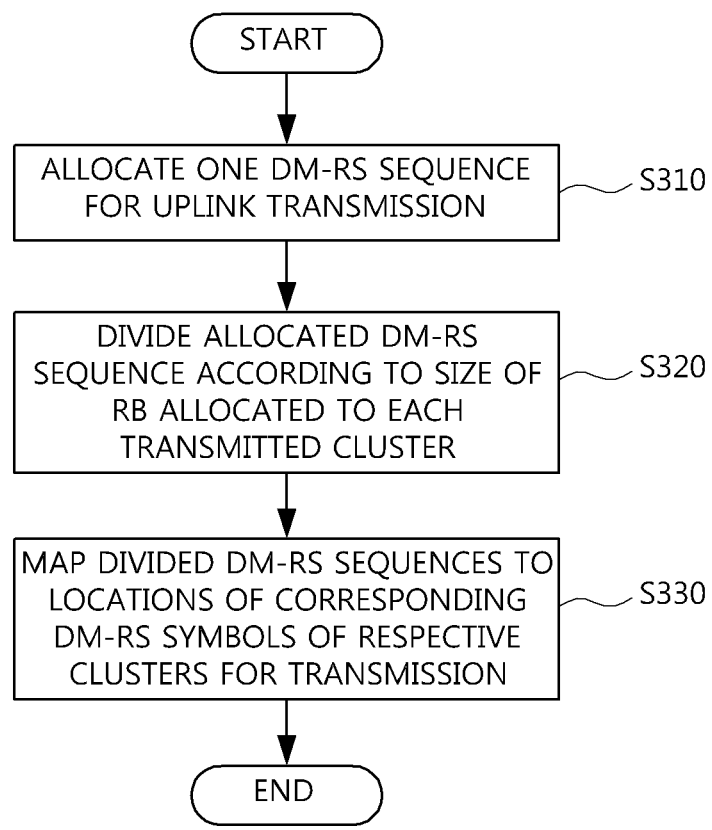
FIG. 3 is a flowchart of a method of generating and transmitting an RS signal according to a first example embodiment of the present invention.

FIG. 3 is a flowchart of a method of generating and transmitting an uplink DM-RS signal according to a first example embodiment of the present invention.

Referring to FIG. 3, a method of generating and transmitting an RS signal according to the first example embodiment of the present invention may include an operation of allocating one DM-RS sequence for uplink transmission (S310); an operation of dividing the DM-RS sequence allocated in operation S310 according to lengths of respective transmitted clusters (S320); and an operation of mapping the divided DM-RS sequences to locations of corresponding DM-RS symbols of the respective clusters for transmission (S330).

In this case, the operation of allocating one DM-RS sequence for uplink transmission (S310) may conform to an uplink DM-RS sequence allocation method in conventional LTE. That is, the DM-RS sequence of the LTE is generated from a CAZAC sequence, and has a length equal to the number of sub-carriers corresponding to the number of resource blocks (RBs) allocated a DM-RS (one RB corresponds to 12 sub-carriers on a frequency).

Accordingly, in the first example embodiment, a DM-RS sequence having a length corresponding to a sum of the numbers of sub-carriers allocated to respective clusters may be allocated. For example, it is assumed that uplink transmission consists of three clusters: cluster 1, cluster 2, and cluster 3. When each of cluster 1 and cluster 2 consists of three RBs and cluster 3 consists of four RBs, the length of the generated DM-RS sequence corresponds to 120 sub-carriers, which correspond to the ten RBs (if one RB consists of 12 sub-carriers).

If a total length of the DM-RS to be generated in operation S310 is equal to or greater than a length corresponding to three RBs, the DM-RS sequence may be generated from an extended Zadoff-Chu (ZC) sequence, which is a kind of CAZAC sequence, and if the total length of the DM-RS is smaller than the length corresponding to the three RBs, the DM-RS sequence may be generated using a computer-generated (CG)-CAZAC sequence.

For reference, the CAZAC sequence used for DM-RS generation includes 30 base sequence groups, each including one or two base sequences according to a possible length of the DM-RS. If the DM-RS length is equal to or less than a length corresponding to five RBs, each group includes one base sequence according to the DM-RS length, and if the DM-RS length is greater than the length corresponding to the five RBs, each group includes two base sequences according to the DM-RS length. A base sequence used by terminals in one cell to generate the DM-RS is the base sequence in one of such base sequence groups.

Next, the operation of dividing the DM-RS sequence allocated in operation S310 according to lengths of the respective transmitted clusters (S320) includes dividing the DM-RS sequence generated in operation S310 by a length corresponding to the number of sub-carriers allocated to each cluster.

For example, when ten RBs are divided into three clusters and discontinuously transmitted, one DM-RS sequence is generated to have a length corresponding to ten RBs in operation S310.

In this case, the DM-RS sequence having a length corresponding to ten RBs, which is generated to correspond to an uplink PUSCH channel consisting of ten RBs, is divided by the number of sub-carriers constituting divided RBs and allocated to three clusters: cluster 1, cluster 2, and cluster 3.

That is, cluster 1 is allocated resources of three RBs, and allocated a portion of the DM-RS sequence having a length corresponding to ten RBs to correspond to the number of sub-carriers of the three RBs. Similarly, cluster 2 is allocated resources of three RBs as well, and allocated another portion of the DM-RS sequence having a length corresponding to ten RBs to correspond to the number of sub-carriers of the three RBs. Cluster 3 is allocated resources of four RBs and allocated a remaining portion of the DM-RS sequence having a length corresponding to ten RBs to correspond to the number of sub-carriers of the four RBs.

Meanwhile, each cluster may be sequentially allocated a portion of the DM-RS sequence having a length corresponding to ten RBs. Alternatively, each cluster may be non-sequentially allocated a portion of the DM-RS sequence having a length corresponding to ten RBs.

Finally, the operation of mapping the DM-RS sequences divided in operation S320 to locations of corresponding DM-RS symbols of the respective clusters for transmission (S330) may include locating the DM-RS in one OFDM (SC-FDMA) symbol per one radio slot (0.5 ms) for transmission.

For example, in the uplink of current LTE, in the case of a normal CP in which one slot consists of seven symbols, the DM-RS is mapped to the fourth symbol for transmission, and in the case of an extended CP in which one slot consists of six symbols, the DM-RS is mapped to the third symbol for transmission.

The present invention may be applied even when a frame structure is changed, when the location of the symbol to which the DM-RS is mapped is changed according to a further purpose, or when a figure of the symbol to which the DM-RS is mapped is changed in a sub-frame or frame unit, (e.g., when the DM-RS is located in two symbols of one slot for transmission).

Second Example Embodiment

Figure 4:
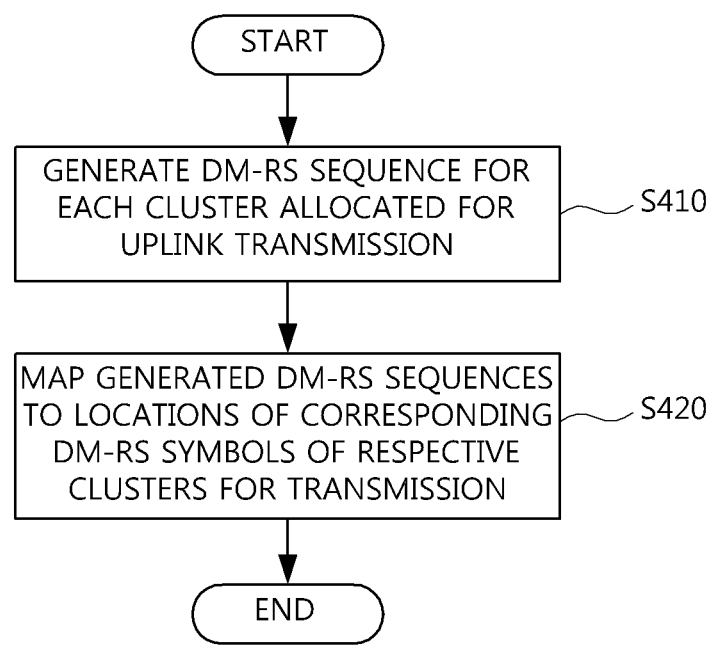
FIG. 4 is a flowchart of a method of generating and transmitting an RS signal according to a second example embodiment of the present invention.

FIG. 4 is a flowchart of a method of generating and transmitting an uplink DM-RS signal according to a second example embodiment of the present invention.

Referring to FIG. 4, a method of generating and transmitting a DM-RS signal according to the second example embodiment of the present invention may include an operation of generating a DM-RS sequence for each cluster allocated for uplink transmission (S410); and an operation of mapping the DM-RS sequences generated in operation S410 to locations of corresponding DM-RS symbols of the respective clusters for transmission (S420).

First, the operation of generating DMRS sequences by the number of clusters allocated for uplink transmission (S410) includes independently allocating the DM-RS sequence to each allocated cluster.

In this case, when the DM-RS sequence is independently allocated to each cluster, clusters having the same size may have the same DM-RS base sequence, but cyclic shift (CS) values of the DM-RSs allocated to the clusters may differ. Alternatively, the CS values may be the same.

For example, since the DM-RSs located in cluster 1 and cluster 2 are located at different frequencies in one terminal, the DM-RS located in cluster 1 is orthogonal to the DM-RS located in cluster 2, even though the clusters have the same base sequence and the same CS.

On the other hand, when clusters located at the same frequency are allocated resources in several terminals, the clusters may have a different CS to maintain DM-RS orthogonality between the terminals.

In this case, clusters not having the same size may have different DM-RS base sequences. For example, if, in one terminal, cluster 1 and cluster 2 are allocated resources with the same size of three RBs and cluster 3 is allocated resources with a size of four RBs, cluster 1 and cluster 2 may have the same base sequences and cluster 3 may have base sequences different from cluster 1 and cluster 2.

Further, clusters having the same base sequences may have different CS values according to whether a cluster of another terminal is allocated to the same frequency resources. When the cluster of the other terminal is not allocated to the same frequency resources, the clusters may have the same CS value.

Finally, the operation of mapping the DM-RS sequences generated in operation S410 to locations of corresponding DM-RS symbols of the respective clusters for transmission (S420) includes mapping the generated DM-RS sequences to locations of corresponding DM-RS symbols of the respective clusters for transmission, similar to operation S330 in the first example embodiment described above.

While the example embodiments of the present invention and their advantages have been described in detail, it should be understood that various changes, substitutions and alterations may be made herein without departing from the scope of the invention.

The invention claimed is:

1. A communication method, comprising:
transmitting, to a user equipment (UE), scheduling information, the scheduling information indicating first location information of a first set of contiguous subcarriers and second location information of a second set of contiguous subcarriers, wherein the first location information indicates a first subcarrier and a last subcarrier of the first set of contiguous subcarriers and the second location information indicates a first subcarrier and a last subcarrier of the second set of contiguous subcarriers;
receiving, from the UE, a demodulation reference signal (DM-RS) sequence using the first set of contiguous subcarriers within a first symbol and the second set of contiguous subcarriers within the first symbol; and
receiving, from the UE, user data using the first set of contiguous subcarriers within a second symbol and the second set of contiguous subcarriers within the second symbol,
wherein:
the DM-RS sequence consists of a first set of elements and a second set of elements,
the first set of contiguous subcarriers within the first symbol is used to receive the first set of elements, and
the second set of contiguous subcarriers within the first symbol is used to receive the second set of elements.

2. The method of claim 1, wherein when a length of the DM-RS sequence is equal to or greater than a length corresponding to three resource blocks (RBs), the DM-RS sequence is generated from an extended Zadoff-Chu (ZC) sequence, and when the length of the DM-RS sequence is shorter than the length corresponding to three resource blocks (RBs), the DM-RS sequence is generated using a computer-generated (CG)-constant amplitude zero autocorrelation (CAZAC) sequence.

3. The method of claim 1, wherein a first number of the first set of contiguous subcarriers is M (being a positive integer) and a second number of the second set of contiguous subcarriers is N (being a positive integer), each of the M contiguous subcarriers of the first symbol comprises one of M elements (0, . . . , M−1) of the DM-RS sequence sequentially, and each of the N contiguous subcarriers of the second symbol comprises one of N elements (M, . . . , M+N−1) of the DM-RS sequence sequentially.

4. The method of claim 3, wherein M and N are determined based on the scheduling information.

5. The method of claim 1, wherein the first set of contiguous subcarriers are not adjacent to the second set of contiguous subcarriers.

6. The method of claim 1, further comprising:
transmitting, to the UE, first information related to a first sequence before transmitting the scheduling information, wherein the first set of contiguous subcarriers has a first length and the second set of contiguous subcarriers have a second length, wherein a length of the first sequence is equal to a sum of the first length and the second length.

7. The method of claim 1, wherein a first length of the first set of contiguous subcarriers and a second length of the second set of contiguous subcarriers are not known to the UE before transmitting the scheduling information.

8. A communication method, comprising:
generating, by a user equipment (UE), a demodulation reference signal (DM-RS) sequence;
receiving, by the UE, scheduling information, the scheduling information indicating first location information of a first set of contiguous subcarriers and second location information of a second set of contiguous subcarriers, wherein the first location information indicates a first subcarrier and a last subcarrier of the first set of contiguous subcarriers and the second location information indicates a first subcarrier and a last subcarrier of the second set of contiguous subcarriers;
transmitting, by the UE, the DM-RS sequence using the first set of contiguous subcarriers within a first symbol and the second set of contiguous subcarriers within the first symbol; and
transmitting, by the UE, user data using the first set of contiguous subcarriers within a second symbol and the second set of contiguous subcarriers within the second symbol, wherein:
the DM-RS sequence consists of a first set of elements and a second set of elements,
the first set of contiguous subcarriers within the first symbol is used to transmit the first set of elements, and
the second set of contiguous subcarriers within the first symbol is used to transmit the second set of elements.

9. The method of claim 8, wherein when a length of the DM-RS sequence is equal to or greater than a length corresponding to three resource blocks (RBs), the DM-RS sequence is generated from an extended Zadoff-Chu (ZC) sequence, and when the length of the DM-RS sequence is shorter than the length corresponding to three resource blocks (RBs), the DM-RS sequence is generated using a computer-generated (CG)-constant amplitude zero autocorrelation (CAZAC) sequence.

10. The method of claim 8, wherein a first number of the first set of contiguous subcarriers is M (being a positive integer) and a second number of the second set of contiguous subcarriers is N (being a positive integer), each of the M contiguous subcarriers of the first symbol comprises one of M elements (0, . . . , M−1) of the DM-RS sequence sequentially, and each of the N contiguous subcarriers of the second symbol comprises one of N elements (M, . . . , M+N−1) of the DM-RS sequence sequentially.

11. The method of claim 10, further comprising:
determining M and N based on the scheduling information.

12. The method of claim 8, wherein the first set of contiguous subcarriers are not adjacent to the second set of contiguous subcarriers.

13. A communication apparatus, comprising:
a circuitry configured to:
cause the apparatus to transmit, to a user equipment (UE), scheduling information, the scheduling information indicating first location information of a first set of contiguous subcarriers and second location information of a second set of contiguous subcarriers, wherein the first location information indicates a first subcarrier and a last subcarrier of the first set of contiguous subcarriers and the second location information indicates a first subcarrier and a last subcarrier of the second set of contiguous subcarriers;
cause the apparatus to receive, from the UE, a demodulation reference signal (DM-RS) sequence using the first set of contiguous subcarriers within a first symbol and the second set of contiguous subcarriers within the first symbol; and
cause the apparatus to receive, from the UE, user data using the first set of contiguous subcarrier within a second symbol and the second set of contiguous subcarriers within the second symbol,
wherein:
the DM-RS sequence consists of a first set of elements and a second set of elements,
the first set of contiguous subcarriers within the first symbol is used to receive the first set of elements, and
the second set of contiguous subcarriers within the first symbol is used to receive the second set of elements.

14. The apparatus of claim 13, wherein when a length of the DM-RS sequence is equal to or greater than a length corresponding to three resource blocks (RBs), the DM-RS sequence is generated from an extended Zadoff-Chu (ZC) sequence, and when the length of the DM-RS sequence is shorter than the length corresponding to three resource blocks (RBs), the DM-RS sequence is generated using a computer-generated (CG)-constant amplitude zero autocorrelation (CAZAC) sequence.

15. The apparatus of claim 13, wherein a first number of the first set of contiguous subcarriers is M (being a positive integer) and a second number of the second set of contiguous subcarriers is N (being a positive integer), each of the M contiguous subcarriers of the first symbol comprises one of M elements (0, . . . , M−1) of the DM-RS sequence sequentially, and each of the N contiguous subcarriers of the second symbol comprises one of N elements (M, . . . , M+N−1) of the DM-RS sequence sequentially.

16. The apparatus of claim 15, wherein M and N are determined based on the scheduling information.

17. The apparatus of claim 13, wherein the first set of contiguous subcarriers are not adjacent to the second set of contiguous subcarriers.

18. A communication apparatus, comprising:
a circuitry configured to:
generate a demodulation reference signal (DM-RS) sequence;
cause the apparatus to receive scheduling information, the scheduling information indicating first location information of a first set of contiguous subcarriers and second location information of a second set of contiguous subcarriers, wherein the first location information indicates a first subcarrier and a last subcarrier of the first set of contiguous subcarriers and the second location information indicates a first subcarrier and a last subcarrier of the second set of contiguous subcarriers;
cause the apparatus to transmit the DM-RS sequence using the first set of contiguous subcarriers within a first symbol and the second set of contiguous subcarriers within the first symbol; and
cause the apparatus to transmit user data using the first set of contiguous subcarriers within a second symbol and the second set of contiguous subcarriers within the second symbol,
wherein:
the DM-RS sequence consists of a first set of elements and a second set of elements,
the first set of contiguous subcarriers within the first symbol is used to transmit the first set of elements, and
the second set of contiguous subcarriers within the first symbol is used to transmit the second set of elements.

19. The apparatus of claim 18, wherein when a length of the DM-RS sequence is equal to or greater than a length corresponding to three resource blocks (RBs), the DM-RS sequence is generated from an extended Zadoff-Chu (ZC) sequence, and when the length of the DM-RS sequence is shorter than the length corresponding to three resource blocks (RBs), the DM-RS sequence is generated using a computer-generated (CG)-constant amplitude zero autocorrelation (CAZAC) sequence.

20. The apparatus of claim 18, wherein a first number of the first set of contiguous subcarriers is M (being a positive integer) and a second number of the second set of contiguous subcarriers is N (being a positive integer), each of the M contiguous subcarriers of the first symbol comprises one of M elements (0, . . . , M−1) of the DM-RS sequence sequentially, and each of the N contiguous subcarriers of the second symbol comprises one of N elements (M, . . . , M+N−1) of the DM-RS sequence sequentially.

21. The apparatus of claim 20, the processor is further configured to determine M and N based on the scheduling information.

22. The apparatus of claim 18, wherein the first set of contiguous subcarriers are not adjacent to the second set of contiguous subcarriers.

23. A communication device for a base station, the device comprising:
a circuitry configured to:
cause the device to transmit, to a user equipment (UE), scheduling information, the scheduling information indicating first location information of a first set of contiguous subcarriers and second location information of a second set of contiguous subcarriers, wherein the first location information indicates a first subcarrier and a last subcarrier of the first set of contiguous subcarriers and the second location information indicates a first subcarrier and a last subcarrier of the second set of contiguous subcarriers;
cause the device to receive, from the UE, a demodulation reference signal (DM-RS) sequence using the first set of contiguous subcarriers within a first symbol and the second set of contiguous subcarriers within the first symbol; and
cause the device to receive, from the UE, use data using the first set of contiguous subcarrier within a second symbol and the second set of contiguous subcarriers within the second symbol,
wherein:
the DM-RS sequence consists of a first set of elements and a second set of elements,
the first set of contiguous subcarriers within the first symbol is used to receive the first set of elements, and
the second set of contiguous subcarriers within the first symbol is used to receive the second set of elements.

24. The device of claim 23, wherein when a length of the DM-RS sequence is equal to or greater than a length corresponding to three resource blocks (RBs), the DM-RS sequence is generated from an extended Zadoff-Chu (ZC) sequence, and when the length of the DM-RS sequence is shorter than the length corresponding to three resource blocks (RBs), the DM-RS sequence is generated using a computer-generated (CG)-constant amplitude zero autocorrelation (CAZAC) sequence.

25. The device of claim 23, wherein a first number of the first set of contiguous subcarriers is M (being a positive integer) and a second number of the second set of contiguous subcarriers is N (being a positive integer), each of the M contiguous subcarriers of the first symbol comprises one of M elements (0, . . . , M-1) of the DM-RS sequence sequentially, and each of the N contiguous subcarriers of the second symbol comprises one of N elements (M, . . . , M+N-1) of the DM-RS sequence sequentially.

26. The device of claim 25, wherein M and N are determined based on the scheduling information.

27. The device of claim 23, wherein the first set of contiguous subcarriers are not adjacent to the second set of contiguous subcarriers.

28. A communication device for a user equipment (UE), the device comprising:
a circuitry configured to:
generate a demodulation reference signal (DM-RS) sequence;
cause the UE to receive scheduling information, the scheduling information indicating first location information of a first set of contiguous subcarriers and second location information of a second set of contiguous subcarriers, wherein the first location information indicates a first subcarrier and a last subcarrier of the first set of contiguous subcarriers and the second location information indicates a first subcarrier and a last subcarrier of the second set of contiguous subcarriers;
cause the UE to transmit the DM-RS sequence using the first set of contiguous subcarriers within a first symbol and the second set of contiguous subcarriers within the first symbol;
cause the UE to transmit user data using the first set of contiguous subcarriers within a second symbol and the second set of contiguous subcarriers within the second symbol,
wherein:
the DM-RS sequence consists of a first set of elements and a second set of elements,
the first set of contiguous subcarriers within the first symbol is used to transmit the first set of elements, and
the second set of contiguous subcarriers within the first symbol is used to transmit the second set of elements.

29. The device of claim 28, wherein when a length of the DM-RS sequence is equal to or greater than a length corresponding to three resource blocks (RBs), the DM-RS sequence is generated from an extended Zadoff-Chu (ZC) sequence, and when the length of the DM-RS sequence is shorter than the length corresponding to three resource blocks (RBs), the DM-RS sequence is generated using a computer-generated (CG)-constant amplitude zero autocorrelation (CAZAC) sequence.

30. The device of claim 28, wherein a first number of the first set of contiguous subcarriers is M (being a positive integer) and a second number of the second set of contiguous subcarriers is N (being a positive integer), each of the M contiguous subcarriers of the first symbol comprises one of M elements (0, . . . , M-1) of the DM-RS sequence sequentially, and each of the N contiguous subcarriers of the second symbol comprises one of N elements (M, . . . , M+N-1) of the DM-RS sequence sequentially.

31. The apparatus of claim 30, wherein the processor is further configured to determine M and N based on the scheduling information.

32. The device of claim 28, wherein the first set of contiguous subcarriers are not adjacent to the second set of contiguous subcarriers.

* * * * *